(12) United States Patent
Bae et al.

(10) Patent No.: US 9,022,938 B2
(45) Date of Patent: May 5, 2015

(54) ULTRASOUND DIAGNOSTIC DEVICE AND METHOD FOR FORMING SCAN LINE DATA

(75) Inventors: Moo Ho Bae, Seoul (KR); Jeong Ho Ham, Seoul (KR); Ra Young Yoon, Seoul (KR); Han Woo Lee, Seoul (KR)

(73) Assignee: Madison Co., Ltd., Hongchun-gun (KR)

( * ) Notice: Subject to any disclaimer, the term of this patent is extended or adjusted under 35 U.S.C. 154(b) by 471 days.

(21) Appl. No.: 12/257,802

(22) Filed: Oct. 24, 2008

(65) Prior Publication Data

US 2009/0112093 A1   Apr. 30, 2009

(30) Foreign Application Priority Data

Oct. 25, 2007 (KR) .................. 10-2007-0107966
Oct. 17, 2008 (KR) .................. 10-2008-0101950

(51) Int. Cl.
*A61B 8/00* (2006.01)
*G01S 7/52* (2006.01)

(52) U.S. Cl.
CPC ......... *G01S 7/52023* (2013.01); *G01S 7/52085* (2013.01)

(58) Field of Classification Search
CPC .............................. G01S 7/52085; A61B 8/00
USPC .................. 600/437, 447, 438, 454, 456
See application file for complete search history.

(56) References Cited

U.S. PATENT DOCUMENTS

| | | | | |
|---|---|---|---|---|
| 4,159,462 A | * | 6/1979 | Rocha et al. ..................... 367/97 |
| 5,014,315 A | * | 5/1991 | Polyak et al. ............... 379/93.06 |
| 5,544,128 A | * | 8/1996 | Kim et al. ...................... 367/119 |
| 6,074,348 A | * | 6/2000 | Chiao et al. ................... 600/443 |
| 6,120,450 A | * | 9/2000 | Li .................................. 600/447 |
| 6,193,662 B1 | * | 2/2001 | Hwang .......................... 600/447 |
| 6,228,031 B1 | * | 5/2001 | Hwang et al. ................. 600/447 |
| 6,231,508 B1 | * | 5/2001 | Miller et al. .................. 600/437 |
| 6,318,179 B1 | * | 11/2001 | Hamilton et al. ............... 73/606 |

(Continued)

FOREIGN PATENT DOCUMENTS

| | | |
|---|---|---|
| JP | 2002-177266 | 6/2002 |
| JP | 2004-49926 | 2/2004 |

(Continued)

OTHER PUBLICATIONS

Office Action issued Feb. 28, 2011, in Korean Patent Application No. 10-2008-0101950.

(Continued)

*Primary Examiner* — Unsu Jung
*Assistant Examiner* — Serkan Akar
(74) *Attorney, Agent, or Firm* — Oblon, McClelland, Maier & Neustadt, L.L.P.

(57) ABSTRACT

An ultrasound diagnostic device includes a plurality of channels configured to receive data and a scan line data forming unit including a plurality of sub-scan line data forming groups and a data summing unit. The sub-scan line data forming group forms partial data of scan lines, and the data summing unit forms scan line data of the scan lines by summing the partial data. The sub-scan line data forming group includes a plurality of sub-scan line data forming units for forming the partial data of the scan lines by using the receiving data and providing a transmission path of the receiving data. First data lines transmit the receiving data between at least one of the sub-scan data forming unit and the channels, and second data lines transfer the receiving data between the sub-scan line data forming units.

10 Claims, 10 Drawing Sheets

(56) References Cited

U.S. PATENT DOCUMENTS

| | | | |
|---|---|---|---|
| 6,406,430 B1* | 6/2002 | Ishrak et al. | 600/441 |
| 6,540,682 B1* | 4/2003 | Leavitt et al. | 600/447 |
| 6,669,640 B2* | 12/2003 | Bae | 600/447 |
| 6,695,783 B2* | 2/2004 | Henderson et al. | 600/443 |
| 6,755,787 B2* | 6/2004 | Hossack et al. | 600/447 |
| 6,796,944 B2* | 9/2004 | Hall | 600/443 |
| 2002/0082500 A1* | 6/2002 | Henderson et al. | 600/443 |
| 2002/0121142 A1* | 9/2002 | Bae et al. | 73/602 |
| 2003/0023164 A1* | 1/2003 | Eichelberger et al. | 600/437 |
| 2003/0045794 A1* | 3/2003 | Bae | 600/437 |
| 2003/0097068 A1* | 5/2003 | Hossack et al. | 600/443 |
| 2003/0216644 A1* | 11/2003 | Hall | 600/437 |
| 2004/0015079 A1* | 1/2004 | Berger et al. | 600/437 |
| 2004/0044284 A1* | 3/2004 | Von Behren et al. | 600/444 |
| 2004/0054285 A1* | 3/2004 | Freiburger et al. | 600/447 |
| 2004/0267135 A1* | 12/2004 | Takeuchi | 600/459 |
| 2005/0033173 A1* | 2/2005 | Von Behren et al. | 600/443 |
| 2006/0058655 A1* | 3/2006 | Little | 600/437 |
| 2006/0092930 A1* | 5/2006 | Shah | 370/389 |
| 2006/0173335 A1 | 8/2006 | Shah et al. | |
| 2007/0106157 A1* | 5/2007 | Kaczkowski et al. | 600/438 |
| 2007/0239001 A1* | 10/2007 | Mehi et al. | 600/437 |
| 2009/0112093 A1* | 4/2009 | Bae et al. | 600/447 |

FOREIGN PATENT DOCUMENTS

| | | |
|---|---|---|
| JP | 2006-102391 | 4/2006 |
| JP | 2006-136711 | 6/2006 |
| JP | 2007-20701 | 2/2007 |
| JP | 2008-504855 | 2/2008 |
| KR | 10-0210035 | 4/1999 |
| WO | WO 2006/003621 A1 | 1/2006 |

OTHER PUBLICATIONS

Extended European Search Report issued Mar. 25, 2013 in Patent Application No. 08018634.9.

Office Action issued on Sep. 10, 2013 in corresponding Japanese Patent Application No. 2008-274367 with its English translation.

* cited by examiner

ULTRASOUND DIAGNOSTIC DEVICE AND METHOD FOR FORMING SCAN LINE DATA

The present application claims priority from Korean Patent Application Nos. 10-2007-107966 (filed on Oct. 25, 2007) and 10-2008-101950 (filed on Oct. 17, 2008), the entire subject matters of which are incorporated herein by references.

BACKGROUND OF THE INVENTION

1. Technical Field

The present invention generally relates to an ultrasound diagnostic device, and more particularly to an ultrasound diagnostic device including receiving data a transmission lines between scan line data forming units and channels. The present invention also relates to a method of forming the scan line data.

2. Background Art

Ultrasound signals transmitted from a transducer (an element) of ultrasound diagnostic device are reflected on a discontinuous surface of acoustic impedance, i.e., on a surface of a reflector in a target object. The transducer converts the reflected ultrasound signals into electric receiving signals. An ultrasound image showing an internal state of the target object is formed with the receiving signals.

To improve the resolution of the ultrasound image, a plurality of transducers is adopted, which are aligned in an array. In case of adopting a plurality of transducers, an outspread of the ultrasound signals can be effectively prevented and receiving sensitivity can be increased compared to the case of adopting a single transducer. Further, it is possible to focus the ultrasound beam electrically.

Focusing of the ultrasound beam includes a transmitting focusing and a receiving focusing. In the transmitting focusing, a transmitting order of the transducers is determined in consideration of the distance differences between the transducers and a focal point. The ultrasound signals transmitted from all the transducers, which participate in simultaneous transmitting, are simultaneously added at the same focal point in a phase. Thus, amplitudes of the transmitting ultrasound signals are at maximum at the focal point. In the receiving focusing, time delays are applied to the ultrasound signals reflected from the focal point so that the ultrasound signals have the same phase, as if the reflected ultrasound signals respectively arrive at the transducers at the same time.

With more focal points, a better resolution can be guaranteed. However, in forming an ultrasound image, the same signal processes should be performed repeatedly as many as the number of the focal points. Thus, the frame rate is decreased in proportion to the focal points. In order to solve this problem, a dynamic receiving focusing is introduced for a fine focusing. According to the dynamic focusing, the number of the receiving focal points increases, while the number of transmitting focal points is fixed. However, the improvement in the resolution is limited due to the fixed number of the transmitting focal points. U.S. Pat. No. 6,231,511 discloses an ultrasound signal focusing method and apparatus for forming data of a scan line by using all the transmitting beams of neighboring scan lines.

For improving a lateral resolution of the ultrasound image and a signal to noise ratio (SNR), it is preferable to transmit the receiving signals (RF data obtained from the receiving signals) provided by all of the transducers participating in one time of receiving (simultaneous receiving), namely, the receiving signals form a full aperture, to a signal focusing unit and a beam former, and to perform synthetic aperture imaging (SAI) with a full frame rate. However, to perform the SAI with the receiving signals from the full aperture, low resolution images (LRIs) of all the scan lines should be formed at the same time, and the LRIs are used to update high-resolution images (HRIs) previously formed. Thus, the receiving signals forming the full aperture should be used to form the respective scan lines, which require more complicated hardware (H/W).

Figure 1:
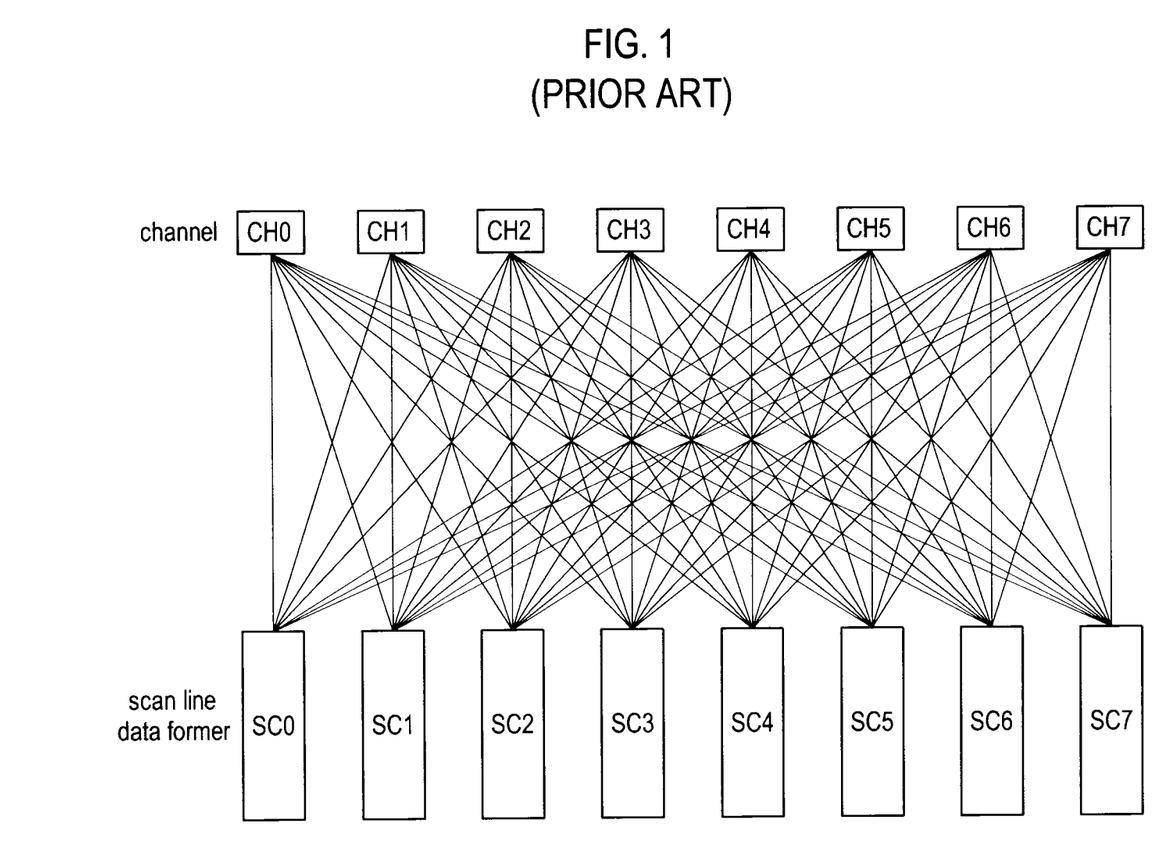
FIG. 1 is a schematic diagram showing a conventional connecting structure between the channels and scan line data formers.

In case of adopting "N" number of channels and "M" number of scan line data former, M×N number of data lines should be configured between the channels and the scan line data formers. Further, M number of RF buffers and accumulators for storing and updating scan line data are needed in consideration of the focusing delay and the apodization. For example, if N=M=128, then 16384 data lines are needed for connecting channels CH0 to CH7 and scan line data formers SC0 to SC7 according to a connection scheme shown in FIG. 1. It is not easy to configure the complicated connecting structure of FIG. 1 on a printed circuit board (PCB), although the semiconductor fabrication technique is being developed rapidly.

DETAILED DESCRIPTION OF THE INVENTION

Figure 2:
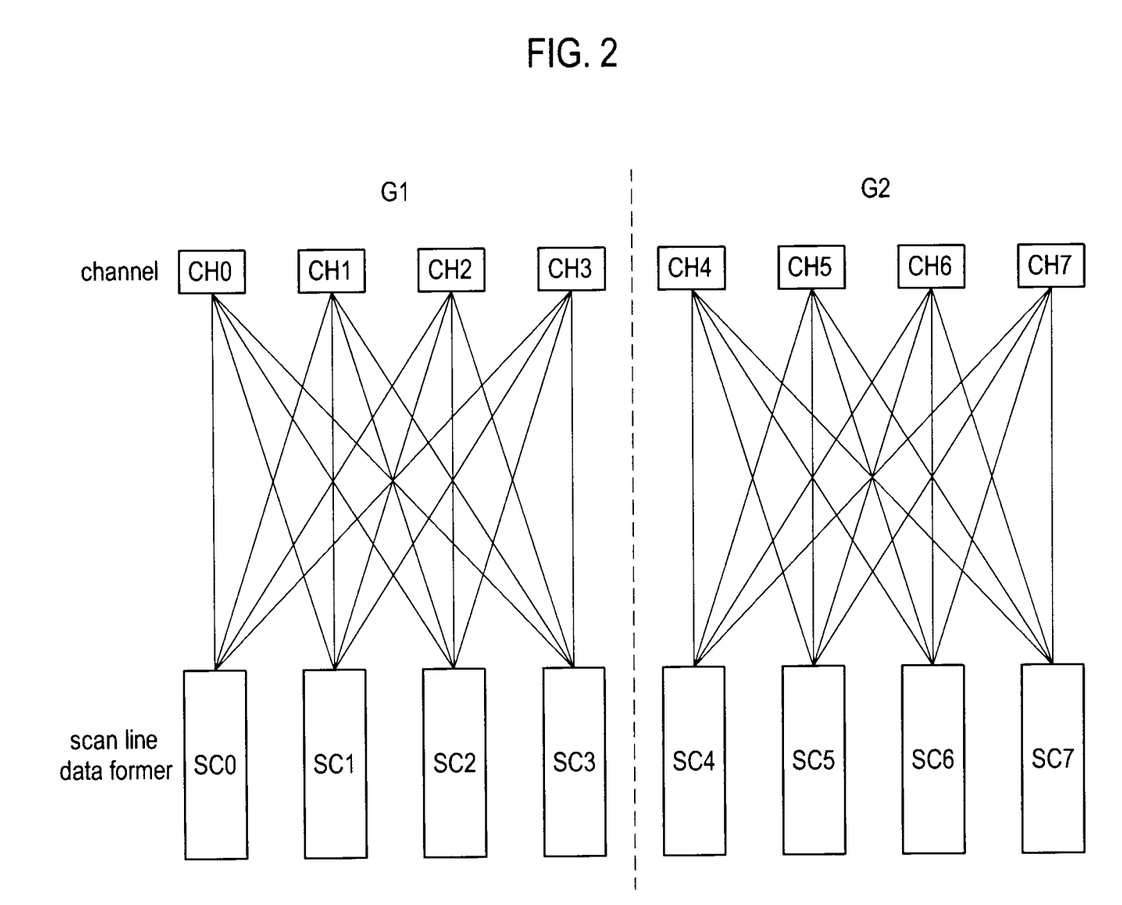
FIG. 2 is a schematic diagram showing an example of connecting structure between the channels and scan line data formers.

Referring to FIG. 2, channels CH0 to CH7, which participated in one time of receiving ultrasound signals reflected from a target body, and scan line data formers SC0 to SC7 are divided into two groups G1 and G2. The scan line data formers SC0 to SC7 are independently configured in the groups G1 and G2. The receiving signals provided by the channels in the same group are transmitted to the scan line data former in the same group. For example, as shown in FIG. 2, the receiving signals of channels CH0 to CH3 in group G1 are transmitted to the scan line data formers SC0 to SC3 in the group G1. Similarly, the receiving signals of channels CH4 to CH7 in group G2 are transmitted to the scan line data formers SC4 to SC2 in the group G2. With the fixed number of the channels, as the number of groups increases, the number of channels corresponding to one scan line data former decreases. Thus, the number of data lines between the channels and the scan line data formers also decreases. However, with the connection structure of FIG. 2, the receiving signals cannot be shared between the groups G1 and G2. Further, the receiving signals of all the channels CH0 to CH7 (full aperture) cannot be used to form each of the scan lines.

Hereinafter, an ultrasound diagnostic device and a scan line data forming method capable of reducing the number of data lines between channels and scan line data forming units will be described.

Figure 3:
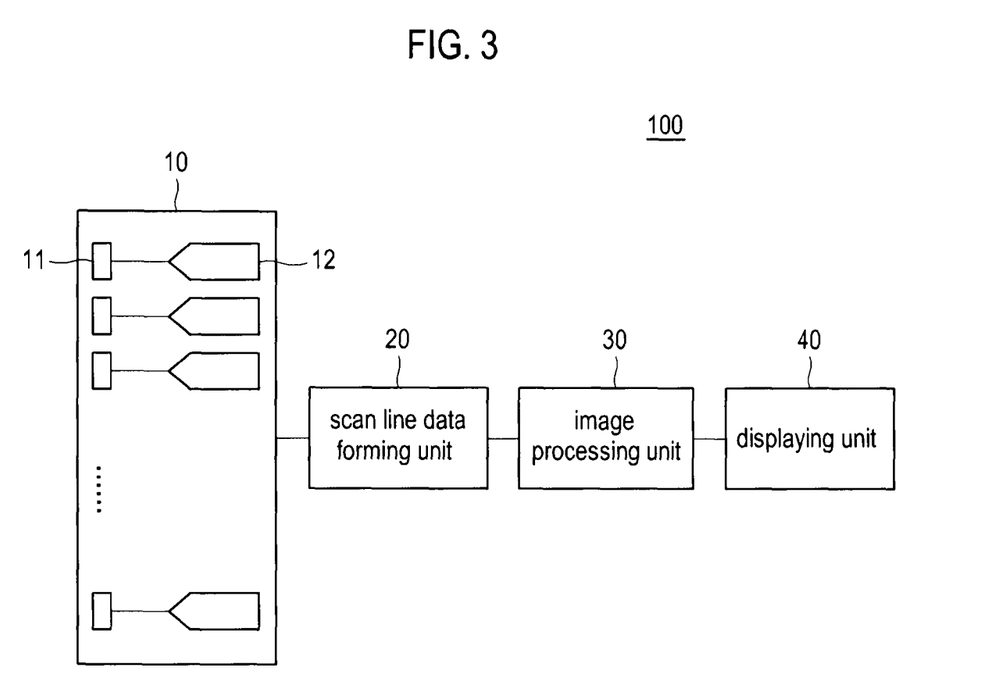
FIG. 3 is a block diagram of an ultrasound diagnostic device in accordance with an embodiment of the present invention.

FIG. 3 is a schematic diagram showing an ultrasound diagnostic device 100 for forming an ultrasound image with a plurality of scan lines in accordance with an embodiment of the present invention. A channel 10 of the ultrasound diagnostic device 100 includes a transducer 11 and an analog-digital converter (ADC) 12. Receiving signals output from the transducer 11 are converted into receiving data (RF data) by the ADC 12. The ultrasound device may further include an amplifier (not shown) for amplifying the receiving signals output from the transducer 11 and for outputting the amplified receiving signals to the ADC 12. The ultrasound diagnostic device 100 further includes a transmitting beam forming unit and a receiving beam forming unit. In FIG. 3, the beam forming units are omitted for simplicity. A scan line data forming unit 20 is configured to form scan line data of scan lines with the receiving data. An image processing unit 30 forms an ultrasound image based on the scan line data. The ultrasound image is displayed on a displaying unit 40.

Figure 4:
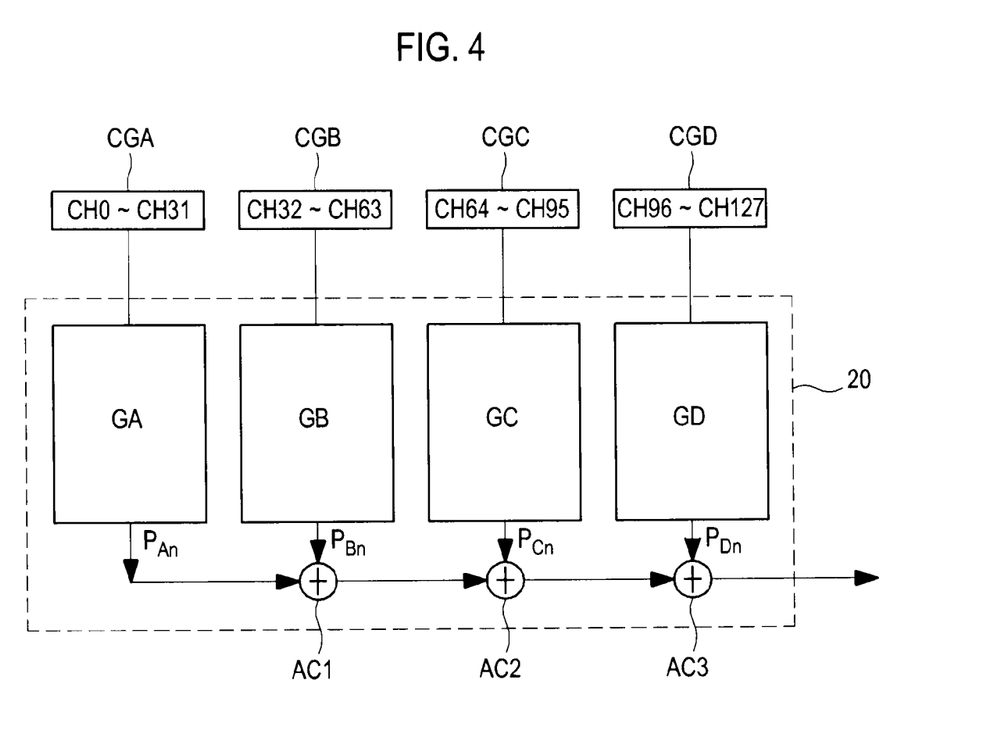
FIG. 4 is a schematic diagram showing a scan line data forming unit which includes a plurality of sub-scan line data forming group corresponding to first channel groups in accordance with an embodiment of the present invention.

Referring to FIG. 4, channels CH0 to CH127, which simultaneously participate in one time of receiving reflected ultrasound signals, are divided into a plurality of first channel groups CGA, CGB, CGG and CGD. The scan line data forming unit 20 includes a plurality of sub-scan line data forming groups GA, GB, GC, and GD. The sub-scan line data forming groups GA to GD correspond to the first channel groups CGA to CGD one to one. Each of the sub-scan line data forming group forms partial data $P_{An}$, $P_{Bn}$, $P_{Cn}$, and $P_{Dn}$ of the scan lines by using the receiving data provided from the corresponding one of the first channel groups. If the scan line data forming unit 20 is designed to form scan line data of 128 scan lines with the receiving data from the channels CH0 to CH127, which participate in one time of receiving, then the four sub-scan line data forming group GA to GD form partial data of the 128 scan lines with the receiving data from corresponding first channel groups CGA to CGD. Thus, the partial data of the same scan lines are outputted from the sub-scan line data forming groups GA to GD. As shown in FIG. 4, when four sub-scan line data forming groups GA to GD are configured in the scan line data forming unit 20, four partial data are formed pre scan line. Data summing units AC1, AC2 and AC3 sum the partial data of the respective scan lines and form scan line data of the respective scan lines.

Figure 5:
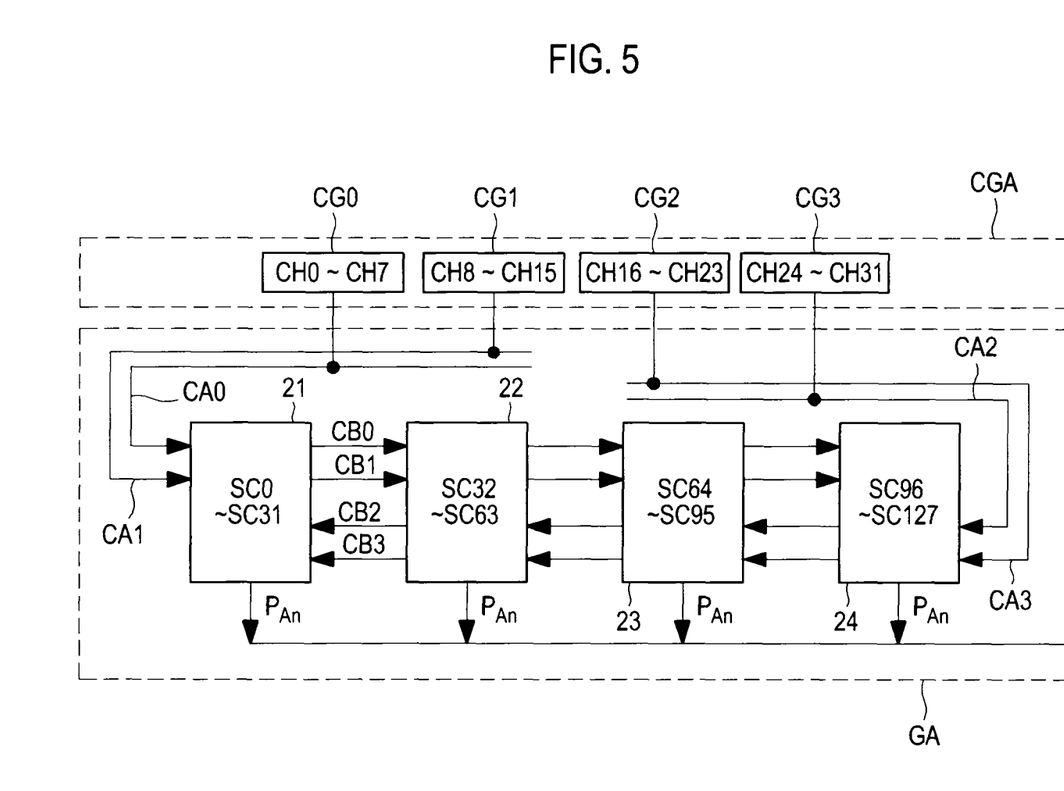
FIG. 5 is a schematic diagram showing a connecting structure between second channel groups and sub-scan line data forming units in the sub-scan line data forming group.

The channels in each of the first channel groups are divided into a plurality of second channel groups. Each of the sub-scan line data forming groups includes a plurality of sub-scan line data forming units. For example, as shown in FIG. 5, the channels CH0~CH31 of the first channel group CGA are divided into the second channel groups CG0, CG1, CG2 and CG3. Further, the sub-scan line data forming group GA includes sub-scan line data forming units 21, 22, 23 and 24. At least one of the first data lines CA0, CA1, CA2 and CA3 are disposed between the first channel group CGA and the sub-scan line data forming group GA, i.e., between the second channel groups CG0 to CG3 and the sub-scan line data forming units, to transmitting the receiving data. The first data lines CA0 to CA3 may be configured with a low-voltage difference signaling (LVDS) diver block. Thus, the first data lines may play a role of an ADC interface between the second channel groups CG0 to CG3 and the sub-scan line data forming unit 21 to 24.

The channels in each of the second channel groups CG0 to CG3 share the same first data lines CA0 to CA3. For instance, channels CH0 to CH7 in the channel group CG0 share the data line CA0, channels CH8 to CH15 in the channel group CG1 share the data line CA1, channels CH16 to CH23 in the channel group CG2 share the data line CA2, and channels CH24 to CH32 in the channel group CG3 share the data line CA3.

Referring to FIG. 5, only two sub-scan line data forming units 21, 24 among all the sub-scan line data forming units 21 to 24 in the sub-scan line data forming group GA, received the receiving data passing through the first data lines CA0 to CA3. For instance, the receiving data from the channel groups CG0 and CG1 pass through the two data lines CA0 and CA1 among the four first data lines CA0 to CA3, and the receiving data from the channel groups CG2 and CG3 pass through the two data lines CA2 and CA3. The receiving data are inputted to the sub-scan line data forming units 22 and 23 not directly through the first data lines CA0 to CA3 but indirectly through second data lines CB0 to CB3 and an adjacent sub-scan line data forming unit 21 or 24. Thus, the sub-scan line data forming units 21 to 24 in the sub-scan line data forming group GA are divided into first sub-scan line data forming units 21 and 24, which are directly connected to the first data lines CA0 to CA3, and second sub-scan line data forming units 22 and 23 that are not directly connected to the first data lines CA0 to CA3.

Figure 6:
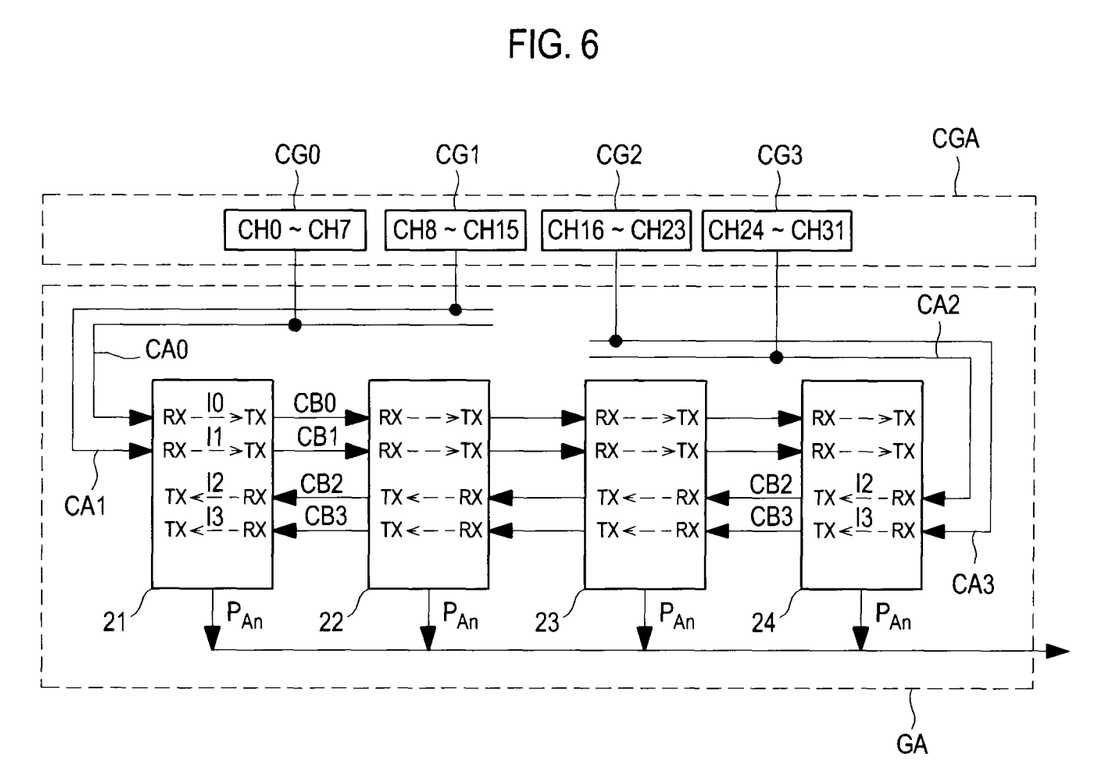
FIG. 6 is a schematic diagram showing internal data lines within the sub-scan line data forming unit.

The receiving data transmitted to the sub-scan line data forming unit 21 through the first data lines CA0 and CA1 are transferred to other sub-scan line data forming units 22 to 24 in the sub-scan line data forming group GA one after the other. In the same manner, the receiving data transmitted to the sub-scan line data forming unit 24 through the first data lines CA2 and CA3 are transferred to other sub-scan line data forming units 23 to 21 one after the other. For transferring the receiving data between the sub-scan line data forming units, internal data lines I0, I1, I2 and I3 are configured in each of the sub-scan line data forming units 21 to 24, as shown in FIG. 6. The internal data lines I0, I1, I2 and I3 correspond to the first data lines CA0 to CA4 one to one. Second data lines CB0, CB1, CB2, CB3 are configured between two adjacent sub-scan line data forming units 21-22, 22-23 and 23-24. The sub-scan line data forming units 21 to 24 having the internal data lines I0, I1, I2 and I3 provide transmission path of the receiving data between the first data lines CA0 to CA3 and the second data lines CB0 to CB3. The receiving data passing through the second data lines CB0, CB1, CB2 or CB3 are transferred again to the adjacent sub-scan line data forming unit 21, 22, 23 or 24. The second data lines CB0 to CB3 are configured with the LVDS driver blocks and play role of a bus interface. The second channel groups CG0 to CG3, the first data lines CA0 to CA3 and the internal data lines I0 to I3 and the second data lines CB0 to CB3 mutually correspond one to one. Input/output and the transmission order of the data among the first data lines CA0 to CA3, the internal data lines I0 to I3 and the second data lines CB0 to CB3 are determined so that all the receiving data inputted to the sub-scan line data forming group GA should be transferred to all the sub-scan line data forming units 21 to 24. The size and power consumption of the sub-scan line data forming units 21 to 24 should be as small as possible.

The sub-scan line data forming units 21 to 24 not only provide the transmission path of the receiving data but also form partial data $P_{Xn}$ of the respective scan lines by using the receiving data from the second channel group CG0, CG1, CG2 or CG3. In "$P_{Xn}$", "X" denotes an identifier of the sub-scan line data forming groups GA to GD and "n" denotes the scan lines. For instance, "$P_{A0}$" means the partial data of the scan line 0 formed by the sub-scan line data forming group GA of which identifier is denoted with "A" as shown in FIG. 4.

Figure 7:
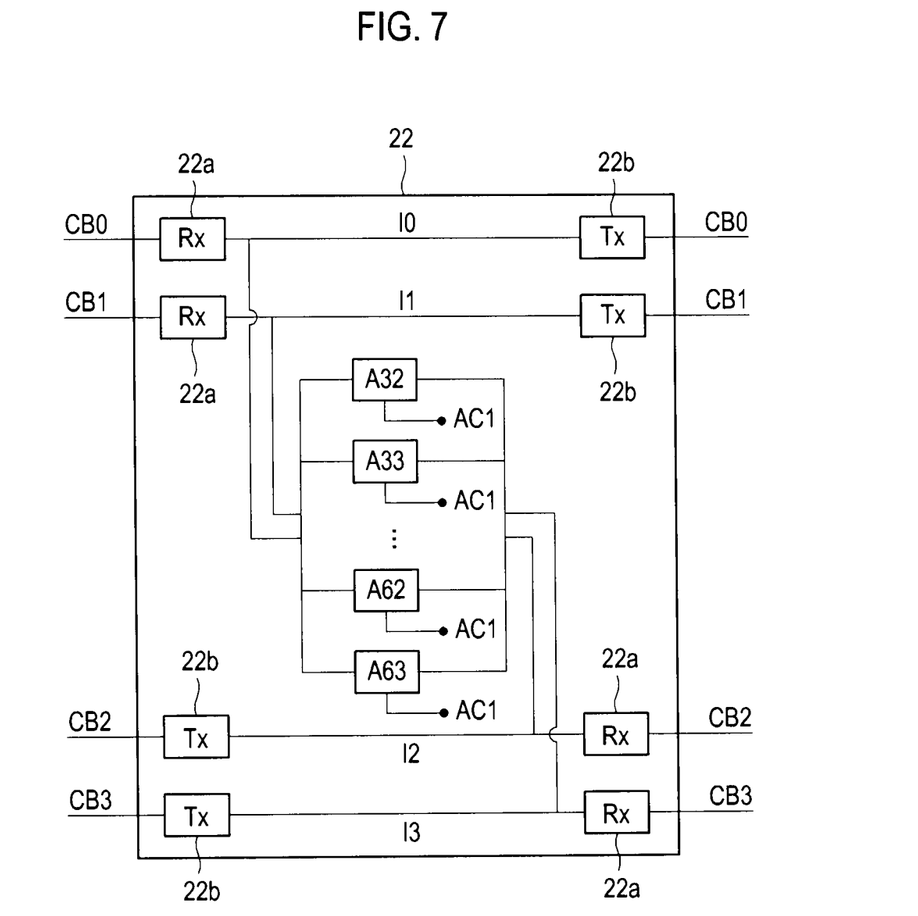
FIG. 7 is a block diagram showing constitution of the sub-scan line data forming unit.

Referring to FIG. 7, the configuration of the sub-scan line data forming units are explained in detail with the sub-scan line data forming unit 22 as an example. In the sub-scan line data forming unit 22, a plurality of partial data forming units A32 to A63 are disposed. The number of the partial data forming units is identical to that of the scan lines SC32 to SC63 which the sub-scan line data forming unit is in charge of forming the partial data thereof. Referring to FIGS. 6 and 7, the partial data forming units A32 to A63, form partial data PA32 to PA63 by using the receiving data input through the second data lines CB0 and CB1 between the sub-scan line data forming units 21 and 22 and the second data lines CB2 and CB3 between the sub-scan line data forming units 23 and 23.

The partial data forming unit $X_n$ receives receiving data $R_k$ through the first data line or the second data line, multiplies weights $w_{nk}$ pre-determined in consideration of the relations between the scan line n and channel k, and sums all of the receiving data multiplied with the weights to form the partial data $P_{Xn}$ as shown in Equation 1.

$$P_{Xn} = \sum_k w_{nk} R_k \qquad (Eq. 1)$$

For an example, if the sub-scan line data forming unit 22 receives receiving data $R_0$ to $R_{32}$ provided from 32 channels CH0 to CH31, the partial data forming unit A32 multiplies the receiving data by the $w_{32k}$, which is pre-determined with relations between the scan line 32 and the channels CH0 to CH31 ($w_{320}R_0, w_{321}R_1 \ldots w_{3231}R_{31}$), and sums the receiving data multiplied with the weights to form the partial data $P_{A32}$ of the scan line$_{32}$ ($P_{A32}=w_{320}R_0+w_{321}R_1+ \ldots +w_{3231}R_{31}$).

The partial data $P_{An}$ of the respective scan lines formed by the partial data forming unit An in the sub-scan line data forming unit 22 are output to the summing unit AC1 shown in FIG. 4. The other sub-scan line data forming units 21, 23 to 24 are identical to the sub-scan line data forming units 22, except the assigned scan lines and data input path, i.e., the first or the second data lines. The sub-scan line data forming units 21 to 24 may be configured with application-specific integrated circuits (ASICs). In FIG. 7, reference number "22*a*" and "22*b*" denote a data receiving unit Rx and data transmitting unit Tx, respectively.

Figure 8:
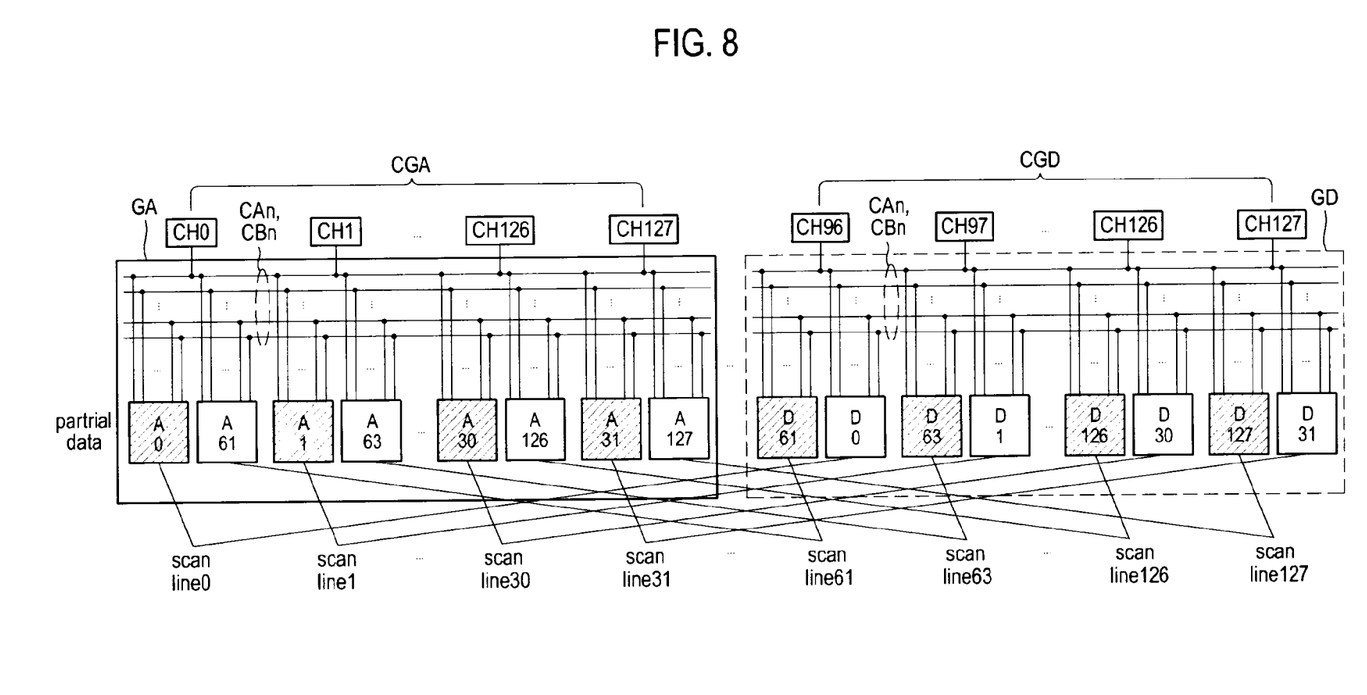
FIG. 8 is a schematic diagram showing the relation of data between partial data forming units and the scan line data of the scan lines in accordance with the present invention.

FIG. 8 is a conceptual diagram showing that scan line data of the scan lines 0 to 127 are formed with the sum of the partial data formed by the sub-scan line data forming groups GA to GD.

Figure 9:
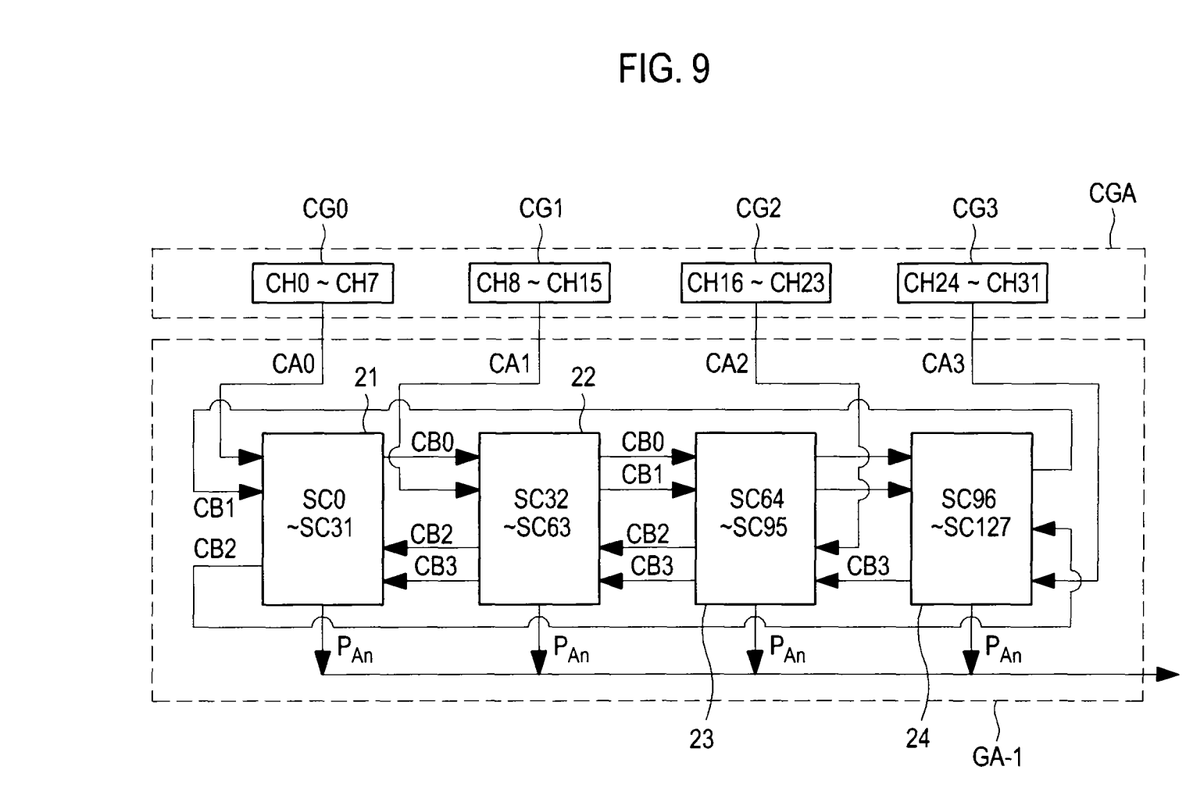
FIG. 9 is a schematic diagram showing a connection structure between sub-scan line data forming units and second channel groups.

In the embodiment illustrated with FIGS. 5 and 6, some sub-scan line data forming units 21 and 24 receive the receiving data directly from the first data lines CA0 to CA4. However, all the sub-scan line data forming units 21 to 24, which are configured in a sub-scan line data forming group GA-1 as shown in FIG. 9, may correspond to the first data lines CA0 to CA3 one to one and receive the receiving data directly from the first data lines CA0 to CA4. The receiving data provided from the corresponding one of the second channel groups CG0 to CG3 are transmitted to each of the sub-scan line data forming units 21 to 24 through the first data lines CA0, CA1, CA2 and CA3, and the receiving data provided from the non-corresponding the corresponding channel groups CG0 to CG3 are transferred to each of the sub-scan line data forming units 21 to 24 through the second data lines CB0 to CB3 configured between the two sub-scan line data forming units.

Figure 10:
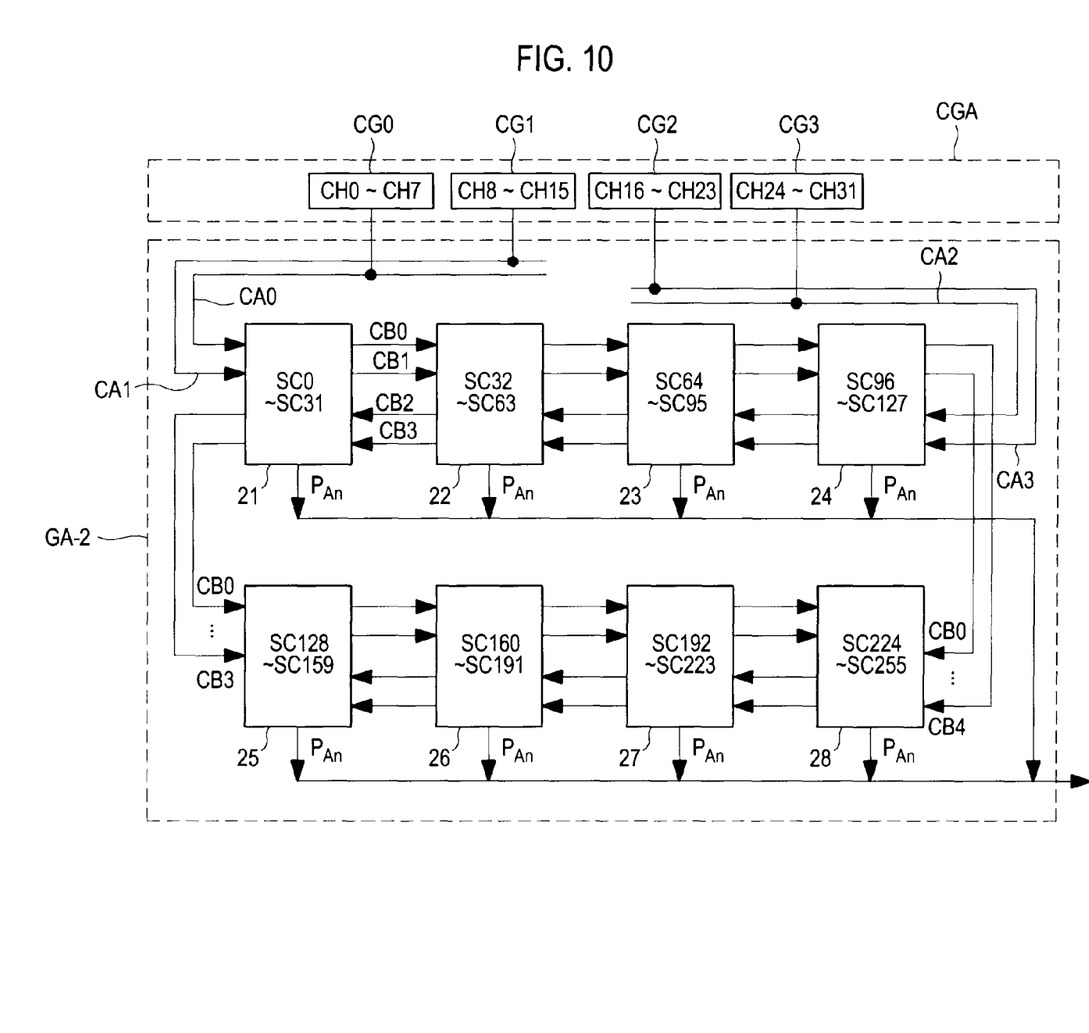
FIG. 10 is a schematic diagram showing the increase of the number of sub-scan line data forming unit in a sub-scan line data forming group.

FIG. 10 shows a scan line data forming group GA-2 for forming scan line data of 256 scan lines by using the receiving data from 32 channels. In the scan line data forming group GA-2, the sub-scan line data forming units, each of which forms the partial data of the 32 scan lines, are configured as many an 256/32, i.e., 8, while scan line data forming groups GA and GA-1, which form scan line data of 256 scan lines, the four sub-scan line data forming units 21 to 24 are configured therein. Similarly, the number of sub-scan line data forming units, which are configured with ASICs, can be variable in proportion to the number of scan lines. Thus, it is easy to design or modifies the ultrasound diagnostic device.

According to the present invention, in the ultrasound diagnostic device for performing the synthetic aperture imaging (SAI) with the maximum frame rate by using the receiving data from all of the channels (full aperture), participating in simultaneous receiving, it is possible to simplify the hardware, especially the number and connection structure of the data lines between the channels and scan line data forming units. Further, it is possible to reduce the size and power consumption of a chip owe to the capability of transmission between the sub-scan line data forming units within the scan line data forming group.

In accordance with one embodiment of the present invention, there is provided a ultrasound diagnostic device, comprising: a plurality of channels for providing receiving data; a scan line data forming unit including a plurality of sub-scan line data forming groups and a data summing unit, wherein the sub-scan line data forming group forms partial data of scan lines, and the data summing unit forms scan line data of the scan lines by summing the partial data; and an image processing unit for forming an ultrasound image using the scan line data, wherein the sub-scan line data forming group includes: a plurality of sub-scan line data forming units for forming the partial data of the scan lines by using the receiving data and providing transmission path of the receiving data; first data lines for transmitting the receiving data between at least one of the sub-scan data forming unit and the channels; and second data lines for transferring the receiving data between the sub-scan line data forming units.

In accordance with another embodiment of the present invention, there is provided a method of forming scan line data of scan lines by using receiving data provided from a plurality of channel groups, comprising: forming partial data of the scan lines by using the receiving data provided from the channel groups; and summing the partial data of the scan lines to form scan line data of the scan lines.

In accordance with another embodiment of the present invention, there is provided a method of forming scan line data of scan lines by using receiving data provided from a plurality of channel groups in a ultrasound diagnostic device including a plurality of channel groups, scan line data forming units for forming the scan line data and sub-scan line data forming units configured in the scan line data forming unit for forming partial data of assigned scan lines among the scan lines, comprising: inputting the receiving data from at least one of the channel groups to a part of the sub-scan line data forming units; transferring the receiving data to all of the sub-scan line data forming units; at each of the sub-scan line data forming units, forming partial data of the assigned scan lines by using the receiving data; and summing the partial data of the scan lines and forming scan line data of the scan lines.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound diagnostic device for performing synthetic aperture imaging, comprising:
   a plurality of channels configured to provide receiving data, wherein the plurality of channels are divided into a plurality of channel groups including a first channel group and a second channel group; and
   a scan line data former, including an integrated circuit, including
      a plurality of groups of sub-scan line data formers, including integrated circuits, including a first sub-scan line data former group and a second sub-scan line data former group connected to the plurality of channel groups one to one,
   wherein the first sub-scan line data former group is configured to form first scan line data corresponding to the first channel group and the second sub-scan line data former group is configured to form second scan line data corresponding to the second channel group,
   wherein the scan line data former is configured to sum the first scan line data and the second scan line data, and the sum of the first scan line data and the second scan line data is used to form an ultrasound image by the ultrasound diagnostic device,
   wherein the first sub-scan line data former group includes:
      a plurality of sub-scan line data formers including a first sub-scan line data former;
      a second sub-scan line data former, wherein a predetermined number of scan lines among all of the scan lines in the first channel group are assigned to the first sub-scan line data former and the first sub-scan line data former is configured to form a first partial scan line data corresponding to the predetermined number of scan lines;
      first data lines configured to transmit the receiving data from a predetermined number of channels in the first channel group to the first sub-scan line data former in the first sub-scan line data former group; and
      second data lines configured to
         transfer the receiving data from the predetermined number of channels in the first channel group transmitted to the first sub-scan line data former, from the first sub-scan line data former to the second sub-scan line data former, and
         transfer the receiving data from a predetermined number of other channels in the first channel group, from the second sub-scan line data former to the first sub-scan line data former.

2. The ultrasound diagnostic device of claim 1, wherein
   the channels are divided into the plurality of channel groups corresponding to the sub-scan line data former groups one to one, and
   channels in the first channel group are divided into a plurality of sub-channel groups.

3. The ultrasound diagnostic device of claim 2, wherein each of the plurality of sub-scan line data formers included in the first sub-scan line data former group is configured to form the partial scan line data by multiplying data received from the first data lines or the second data lines by predetermined weights and summing the received data multiplied by the predetermined weights.

4. The ultrasound diagnostic device of claim 2, wherein each of the plurality of sub-scan line data formers further includes internal data lines having one to one correspondence to at least one from among the first data lines and the second data lines.

5. The ultrasound diagnostic device of claim 2, wherein each of the plurality of sub-scan line data formers includes:
   at least one third sub-scan line data former to be directly connected to the first data line; and
   at least one fourth sub-scan line data former not to be directly connected to the first data line.

6. The ultrasound diagnostic device of claim 2, wherein the integrated circuits, included by the plurality of groups of sub-scan line data formers, are configured with application-specific integrated circuits (ASICs).

7. The ultrasound diagnostic device of claim 2, wherein each of the channels includes a transducer and an analog-digital converter.

8. The ultrasound diagnostic device of claim 7, wherein at least one from among the first data line and the second data line is configured with a low-voltage difference signaling (LVDS).

9. A method, implemented by an ultrasound diagnostic device, of forming scan line data of scan lines for synthetic aperture imaging, the method comprising:
   dividing channels into a plurality of channel groups including a first channel group and a second channel group, wherein the ultrasound diagnostic device comprises a scan line data former, including an integrated circuit, including a plurality of groups of sub-scan line data formers, including integrated circuits, including a first sub-scan line data former group and a second sub-scan line data former group connected to the plurality of channel groups one to one;
   forming, by the first sub-scan line data former group, first scan line data corresponding to the first channel group;
   forming, by the second sub-scan line data former group, second scan line data corresponding to the second channel group;
   summing, by the scan line data former, the first scan line data and the second scan line data; and
   forming an ultrasound image using output of the scan line data former, wherein the first sub-scan line data former group includes:
a plurality of sub-scan line data formers including a first sub-scan line data former and a second sub-scan line data former,
first data lines, and
second data lines,
wherein a predetermined number of scan lines among all of the scan lines in the first channel group are assigned to the first sub-scan line data former, and
wherein the method further includes:
forming, via the first sub-scan line data former, a first partial scan line data corresponding to the predetermined number of scan lines;
transmitting, via the first data lines, receiving data from a predetermined number of channels in the first channel group to the first sub-scan line data former in the first sub-scan line data former group,
transferring, via the second data lines, the receiving data from the predetermined number of channels in the first channel group transmitted to the first sub-scan line data former, from the first sub-scan line data former to the second sub-scan line data former, and
transferring, via the second data lines, the receiving data from a predetermined number of other channels in the first channel group, from the second sub-scan line data former to the first sub-scan line data former.

10. The method of claim 9, wherein the first partial scan line data are formed by multiplying data received from the first data lines or the second data lines by predetermined weights and summing the received data multiplied by the predetermined weights.

* * * * *